United States Patent Office 3,586,495
Patented June 22, 1971

3,586,495
PRODUCTION OF NITROGENOUS AND PHOSPHATE FERTILIZERS
Robert Bauwens and Roland Julou, Colombes, France, assignors to Societe Anonyme Ugine Kuhlmann, Paris, France
No Drawing. Filed May 15, 1968, Ser. No. 729,367
Claims priority, application France, May 22, 1967, 107,296
Int. Cl. C05b $15/00$
U.S. Cl. 71—29                                                6 Claims

ABSTRACT OF THE DISCLOSURE

A process for producing a nitrogen-phosphate fertilizer wherein the available amount of phosphoric anhydride $P_2O_5$ is totally water-soluble and is, therefore, suitable for the manufacture of liquid fertilizers. Wet phosphoric is defluosilicated, ammoniated and treated with urea to produce the nitrogen-phosphate fertilizer.

---

The object of the invention is a process for obtaining a totally water-soluble nitrogenous-phosphate fertilizer consisting essentially in using a wet process phosphoric acid; in removing the fluosilicic acid from the said phosphoric acid in a known manner with a sodium salt, followed by separating out the insolubilized sodium fluosilicate; in ammoniating the defluosilicated acid to a pH of 5 to 6, and preferably from 5.5 to 6; in removing substantially all the water from the reaction mixture and in treating the resulting ammoniated phosphate in a dry process with urea in amounts of from 0.2 to 0.9 molecule of urea per mole of $P_2O_5$ for 15 to 70 minutes at a temperature of between 135 and 160° C., the mixture being subsequently left to cool and, if necessary, diluted with water.

This invention relates to fertilizers, and more particularly to a process for the manufacture of a nitrogen-phosphate fertilizer wherein the available amount of phosphoric anhydride $P_2O_5$ is totally water-soluble and is, therefore, suitable for the manufacture of liquid fertilizers.

Liquid fertilizers have lately been used with increasing frequency, owing to the ease with which liquids can be handled and applied. These fertilizers are usually produced by ammoniating phosphoric acid produced by the thermal or wet process. Phosphate produced from phosphoric acid prepared by the thermal process is relatively pure and provides a clear solution, but for economical reasons phosphate obtained from phosphoric acid by the wet process is being used more and more frequently. Unfortunately this product contains insoluble compounds such as iron, aluminum, calcium and magnesium phosphates which are troublesome in the liquid fertilizer industry which prefers solutions which are substantially free from solid precipitates.

Various methods have already been suggested for excluding solids from liquid phosphate fertilizers.

According to a first process suggested in the prior art, phosphoric acid is ammoniated to obtain a sufficiently alkaline solution (ph >5) to make iron, aluminium, calcium and magnesium phosphates, as well as silica, insoluble under conditions ensuring the best possible filtering properties. Filtering followed by evaporating to dryness is effected to obtain the mono- or diammonic phosphate, or a mixture of both. The ammonium phosphate obtained by such a process is completely soluble, but the total amount of phosphoric anhydride $P_2O_5$ in the insoluble phosphates is lost in the final fertilizer.

According to another prior method for use in the case where only an agricultural quality of ammonium phosphate is available, i.e. a compound containing all the above-mentioned impurities, it is possible to dissolve the phosphate in water when it is required for use and then filter the solution obtained. But the texture of the metal phosphates and silica make the operation very difficult and, as in the previous case, a certain amount of $P_2O_5$ is lost when the fertilizer is used.

According to another prior art technique a water-soluble nitrophosphate fertilizer can be produced by ammoniating wet process polyphosphoric acid. The condensed phosphorous molecule being a sequestering agent for metal ions. The fertilizer so obtained contains useful elements contributed by the wet process phosphoric acid. Unfortunately the starting polyphosphoric acid is costly.

The process of the invention avoids the drawbacks of the prior methods and enables a totally soluble ammonium phosphate for agricultural use to be obtained from wet process phosphoric acid, without having to remove insoluble phosphates as in the first two processes mentioned, and without using polyphosphoric acid as in the third process hereinbefore described. The process of the invention is based on obtaining an exact proportion of polyphosphate during manufacture which maintains the metal impurities in solution, said process being applied to a silica-free phosphoric acid.

The object of the invention, therefore, is a process for obtaining a totally water-soluble nitrogen-phosphate fertilizer, consisting essentially in using a phosphoric acid produced by the wet process; in removing the fluosilicic acid existing in the said polyphosphoric acid by a known treatment by the use of a sodium salt, followed by separating out the insolubilized sodium fluosilicate; in ammoniating the defluosilicated acid to a pH of 5 to 6, and preferably from 5.5 to 6.0; in removing substantially all water from the reaction mixture, and in dry treating with urea the ammoniated phosphate so obtained, in amounts of 0.2 to 0.9 molecule of urea per mole of $P_2O_5$ for 15 to 70 minutes at between 135 and 160° C., after which the mixture is allowed to cool and, if necessary, diluted with water.

It should be noted that the treatment of ammonium phosphates with urea has been suggested in the prior technique. French Patent No. 1,411,254 for instance, describes fireproof paint compositions comprising a water-insoluble ammonium polyphosphate, which is the reaction product of a monoammonium phosphate or phosphoric acid and urea. The reaction with urea is carried out at high temperatures between about 170 and 260° C. and the reaction lasts for one to two hours. The mole ratio of nitrogen to phosphorus is between about 0.7 and 5. The reaction conditions provided for in French Patent No. 1,411,254 are imposed by the use of ammonium polyphosphates as fireproof additives.

As an illustration of the prior technique French Patent No. 1,437,486 can also be cited. It describes a process for the manufacture of chain condensed ammonium phosphates in which urea is used for treating phosphates at reaction temperatures in the range of 180–400° C., while 0.5 to 2.5 atom-gram of nitrogen are used per molecule of water relased by the formation of the polyphosphate. These reaction conditions enable a special class of polyphosphates to be obtained.

The invention also turns the reaction of urea and orthophosphates to account, but uses it for manufacturing fertilizers from wet process phosphoric acid containing various impurities such as iron, aluminium, calcium and magnesium phosphates among others. According to an essential characteristic of the process of the invention just sufficient urea is used to cause the aforesaid impurities to be solubilized, as well as those which may be contained in the other constituents of liquid fertilizers. Furthermore, to obtain complete solubilization, it has been found necessary to use a monoammonium phosphate containing a small amount of diammonium phosphate and having a pH (1% solution of $P_2O_5$) in the range of between 5.0 and 6.0 and preferably between 5.5 and 6.0 rather than a monoammonium phosphate. This is an essential additional characteristic of the invention as, by starting with a product having an exactly controlled monoammonium term, the resulting fertilizer contains a large amount of insolubles consisting mainly of a special variety of iron and aluminium phosphate. These results are obtained according to the invention, the following theoretical explanation in no way constituting a limitation, by the combination of the following reactions which take place owing to the conditions of temperature and medium:

In an acid medium and in the presence of water urea has a tendency to break down according to Equation 1

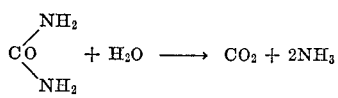

But, as the reaction system contains no free water, or only very small amounts thereof, reaction (1) is only possible when starting with the orthophosphate group with formation of polyphosphate by condensation of the phosphoric acid molecule, according to Equation 2 for instance:

(2)
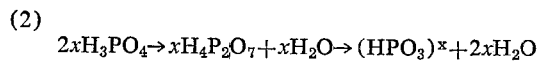

The ammonia created in reaction (1) remains bound to the phosphoric or polyphosphoric acid groups, thus enabling an ammonium-enriched phosphate product to be obtained as compared with the starting monoammonium phosphate.

It is not as yet possible to give a fully justified reason for its being necessary to use a monoammonium phosphate containing a certain amount of diammonium phosphate. It is suggested that iron and aluminium phosphate precipitated in too acid a zone does not have exactly the same composition as phosphate precipitated in a more alkaline zone, and that it develops during heat treatment in the presence of urea, generating an insoluble phosphate or polyphosphate.

The process of the invention makes use of a phosphoric acid obtained by the wet process and containing 30 to 55% by weight of $P_2O_5$, and preferably 30 to 40%.

In a first step the silica is removed from the wet process phosphoric acid by insolubilizing the fluosilicic acid found in the phosphoric acid. This treatment is carried out with an equimolecular amount of fluosilicic acid to a sodium salt, preferably sodium carbonate, sulphate or sulphide. The insoluble fluosilicate is removed from the solution by filtration or decantation. It should, however, be noted that when a 54–55% commercial phosphoric acid is used this preliminary treatment is not necessary.

The defluosilicated phosphoric acid is then subjected to a known ammoniating process until the pH of the reaction mixture is between 5 and 6 and preferably between 5.5 to 6.0. The prepared paste can be dried to obtain a substantially anhydrous phosphate suitable for the next step in the process of the invention. This step, which is the essential characteristic of the invention, consists in the addition of urea to said dry phosphate. The proportions of the reagents, expressed in the mole ratio of urea to $P_2O_5$ available in the phosphate are in the range of 0.2 to 0.9. The mixture of said phosphate is heated at between 130 and 170° C. for 15 to 70 minutes to permit conversion of the starting orthophosphate. A dry mixture is thus obtained which is allowed to cool and which constitutes a completely water-soluble nitrogen-phosphate fertilizer.

The invention will be illustrated by the following examples without being limited thereby.

In all the examples a wet process phosphoric acid titrating 30% of $P_2O_5$ was used, obtained by sulfuric attack on a natural phosphate from TOGO. The phosphoric acid was first defluosilicated by the addition of sodium carbonate in an amount of 15.9 g./kg. of acid. The solution thus obtained was filtered and neutralized by ammonia to pH 5.8 in Examples 1 to 5, to pH 4.7 for Example 6, to pH 6 for Example 7 (1% $P_2O_5$ solutions). A phosphate was produced which was dried and mixed with variable amounts of urea and then dried at a temperature of from 135° C. before the condensation reaction. The following specific examples illustrate the reaction conditions of treatment of said phosphate by urea.

EXAMPLE 1

70 g. of urea is added to an intimately mixed with 350 g. of phosphate. This mixture is heated at 135° C. for 30 minutes. The product so obtained is completely soluble and the solution remains clear for several weeks. Its analytic composition is as follows:

| | |
|---|---|
| Percent N | 19.4 |
| Percent $P_2O_5$ | 53 |
| pH | 6.6 |
| Percent insoluble | 0.015 |
| Percent nitrogen loss | 5 |
| Percent urea conversion | 50 |

The starting ammonium phosphate had the following composition:

| | |
|---|---|
| Percent N | 12.85 |
| Percent $P_2O_5$ | 57 |
| pH | 5.8 |
| Percent isoluble | 6.49 |

It should be noted that the nitrogen lost in the form of $NH_3$ could be recovered.

EXAMPLE 2

This process is the same as that used in Example 1 except that the proportions of reagents are 350 g. phosphate for 30 g. urea. After the addition of water the resulting product gives a clear solution which remains stable for several weeks and has the following proportions on analysis:

| | |
|---|---|
| Percent N | 15.65 |
| Percent $P_2O_5$ | 55.4 |
| pH | 6.1 |
| Percent insoluble | 0.19 |
| Percent nitrogen loss | 4 |
| Percent urea conversion | 56 |

EXAMPLE 3

30 g. of urea and 350 g. of ammonium phosphate are heated for 45 minutes at 140° C. The resulting product gives clear and stable solutions in water. It has the following characteristics:

| | |
|---|---|
| Percent N | 15.7 |
| Percent $P_2O_5$ | 55.8 |
| pH | 6.6 |
| Percent insoluble | 0.1 |
| Percent nitrogen loss | 7 |
| Percent urea conversion | 96.25 |

EXAMPLE 4

A mixture of 350 g. of ammonium phosphate and 30 g. of urea is heated at 155° C. for 15 minutes. The resulting water-soluble product gives the following results on analysis:

| | |
|---|---|
| Percent N | 15.45 |
| Percent $P_2O_5$ | 56.1 |
| pH | 6.4 |
| Percent insoluble | 0.1 |
| Percent nitrogen loss | 9 |
| Percent urea conversion | 100 |

EXAMPLE 5

A mixture of 350 g. of ammonium phosphate and 20 g. of urea is heated at 155° C. for 15 minutes. As in the previous examples the resulting product gives clear solutions in water. The results of analysis are as follows:

| | |
|---|---|
| Percent N | 15.55 |
| Percent $P_2O_5$ | 57.5 |
| pH | 6.35 |
| Percent insoluble | 0.15 |
| Percent nitrogen loss | 1.1 |
| Percent urea conversion | 100 |

EXAMPLE 6

The monoammonium phosphate prepared from defluosilicated wet process phosphoric acid by ammoniation to a pH less than 5, does not give comparable results. By reacting 10 g. of urea and 350 g. of this phosphate for 30 minutes at 140° C. a product is obtained that is not completely soluble (5.75% insoluble).

The starting ammonium phosphate has the following composition:

| | |
|---|---|
| Percent N | 11.45 |
| Percent $P_2O_5$ | 57.5 |
| pH | 4.7 |
| Percent insoluble | 9.3 |

The product obtained after reaction with urea has the following composition:

| | |
|---|---|
| Percent N | 18.3 |
| Percent $P_2O_5$ | 51 |
| pH | 6.4 |
| Percent insoluble | 5.75 |
| Percent nitrogen loss | 2.8 |

EXAMPLE 7

The same wet process acid as that used in the previous example is defluosilicated and ammoniated to pH 6. The resulting dried, ground phosphate has the following characteristics:

| | |
|---|---|
| Percent N | 12.55 |
| Percent $P_2O_5$ | 57.5 |
| Percent insoluble | 8.7 |
| pH | 6 |

By heating 350 g. of this phosphate with 70 g. of urea for 30 minutes at 140° C. a completely soluble product is obtained having the following characteristics:

| | |
|---|---|
| Percent N | 18.9 |
| Percent $P_2O_5$ | 52.8 |
| pH | 7 |
| Percent insoluble | 0.2 |
| Percent nitrogen loss | 6.15 |
| Percent urea conversion | 62 |

What we claim is:

1. A process for the production of a totally water-soluble nitrogen-phosphate fertilizer by the ammoniation of phosphoric acid prepared by the wet process and containing various impurities including fluosilicic acid, consisting in:

(i) treating phosphoric acid prepared by the wet process and containing impurities including fluosilicic acid with a substantially equimolecular amount of a sodium salt to obtain an insoluble sodium fluosilicate which is separated out, and a defluosilicated phosphoric acid, (ii) ammoniating said defluosilicated phosphoric acid until there is obtained an aqueous reaction solution with a pH between about 5 and 6, and containing ammoniated phosphate;

(iii) eliminating substantially all the water from the said reaction solution to obtain a dry ammoniated phosphate;

(iv) treating said dry ammoniated phosphate with urea in amounts of 0.2 to 0.9 molecule of urea per mole of $P_2O_5$ for 15 to 70 minutes at between 135 and 160° C., thus producing a nitrogenous phosphate product;

(v) recovering a completely water-soluble nitrogen-phosphate fertilizer by cooling said product.

2. The process of claim 1 wherein the said wet process phosphoric acid contains 30 to 55% by weight of $P_2O_5$.

3. The process of claim 1 wherein the said wet process phosphoric acid contains 30 to 40% by weight of $P_2O_5$.

4. The process of claim 1 wherein the pH of the said aqueous reaction solution is between 5.5 and 6.

5. The process of claim 1 wherein the amount of urea used to treat said dry ammoniated phosphate is exactly sufficient to cause solubilization of the phosphate impurities in said wet process phosphoric acid and the other impurities contained in the reaction mixture.

6. The process of claim 1 wherein the said dry ammoniated phosphate comprises a major portion of monoammonium phosphate and a minor fraction of diammonium phosphate.

References Cited

UNITED STATES PATENTS

| | | | |
|---|---|---|---|
| 2,783,139 | 2/1957 | Datin | 71—41 |
| 2,814,556 | 11/1957 | Christoffel | 71—41 |
| 3,037,855 | 6/1962 | Smith | 71—43 |
| 3,369,885 | 2/1968 | Takahashi et al. | 71—46 |

REUBEN FRIEDMAN, Primary Examiner

C. N. HART, Assistant Examiner

U.S. Cl. X.R.

71—34